United States Patent [19]
Lee

[11] Patent Number: 5,081,703
[45] Date of Patent: Jan. 14, 1992

[54] SATELLITE MOBILE COMMUNICATION SYSTEM FOR RURAL SERVICE AREAS

[75] Inventor: William C. Y. Lee, Corona Del Mar, Calif.

[73] Assignee: Pactel Corporation, San Francisco, Calif.

[21] Appl. No.: 544,607

[22] Filed: Jun. 27, 1990

[51] Int. Cl.⁵ .................... H04B 7/185; H04B 7/19
[52] U.S. Cl. ................................ 455/13; 455/15; 455/20; 455/23; 455/51
[58] Field of Search ................... 455/12, 13, 14, 15, 455/20, 23, 44, 45, 33, 51, 54, 7, 11, 10, 16, 17, 24, 56, 208; 379/59, 60, 343; 375/110, 111; 370/404.1

[56] References Cited

U.S. PATENT DOCUMENTS

| | | | |
|---|---|---|---|
| 4,273,962 | 6/1981 | Wolfe | 179/7.1 R |
| 4,506,383 | 3/1985 | McGann | 455/17 |
| 4,672,655 | 6/1987 | Koch | 379/57 |
| 4,700,374 | 10/1987 | Bini | 379/60 |
| 4,704,733 | 11/1987 | Kawano | 455/16 |
| 4,764,979 | 8/1988 | Noguchi et al. | 455/22 |
| 4,849,963 | 7/1989 | Kawano et al. | 370/30 |

Primary Examiner—Reinhard J. Eisenzopf
Assistant Examiner—Chi H. Pham
Attorney, Agent, or Firm—McCubbrey, Bartels, Meyer & Ward

[57] ABSTRACT

A mobile communications system uses a communications satellite and a Mobile Telephone Switching Office (MTSO) and communicates with mobile units via the satellite. A cell site has a co-located cell site converter which converts satellite signals to signals for the MTSO and vice-versa. Remote converter sites communicate with the satellite and with the mobile units in given geographical areas. A single satellite link is sufficient for adequate RSA service. Frequency and phase differences among signals from the remote sites to the satellite are synchronized to avoid frequency- and phase-drift.

6 Claims, 4 Drawing Sheets

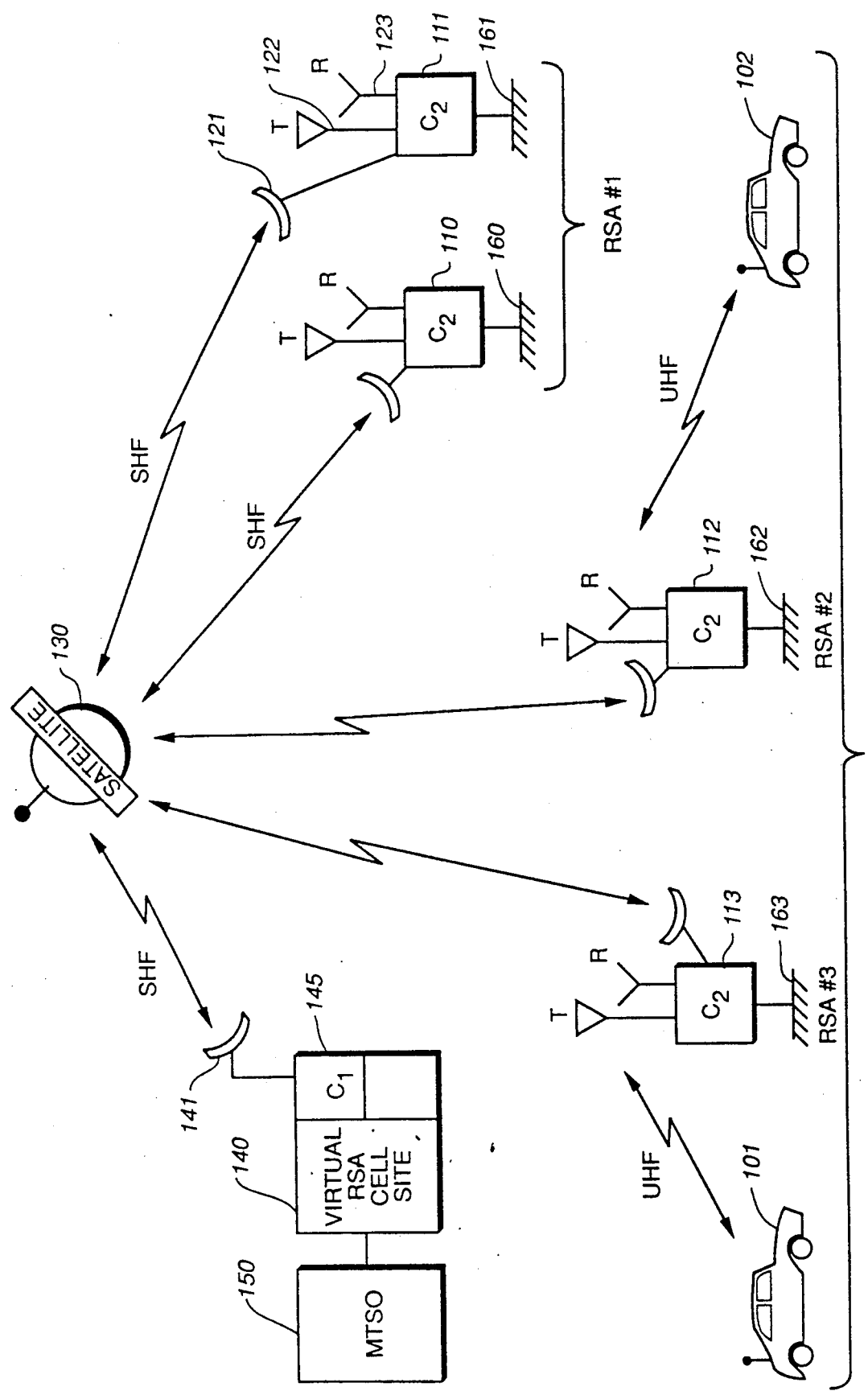
FIG._1

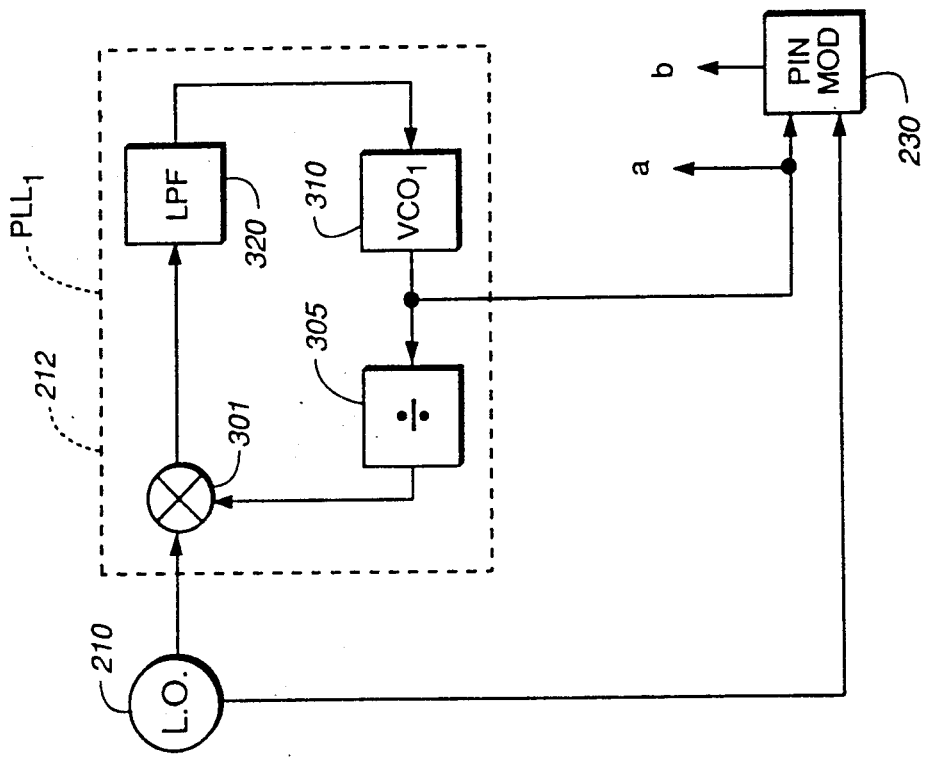
FIG._3
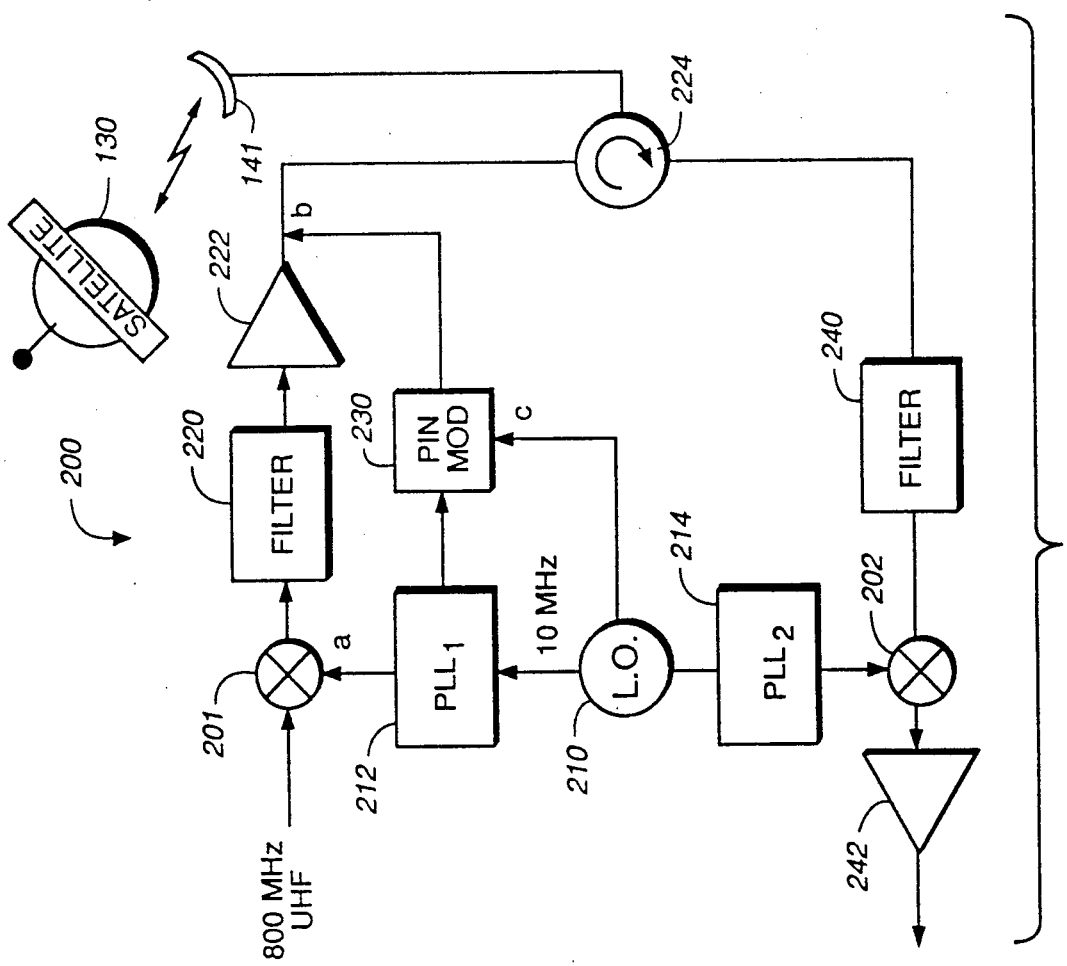
FIG._2

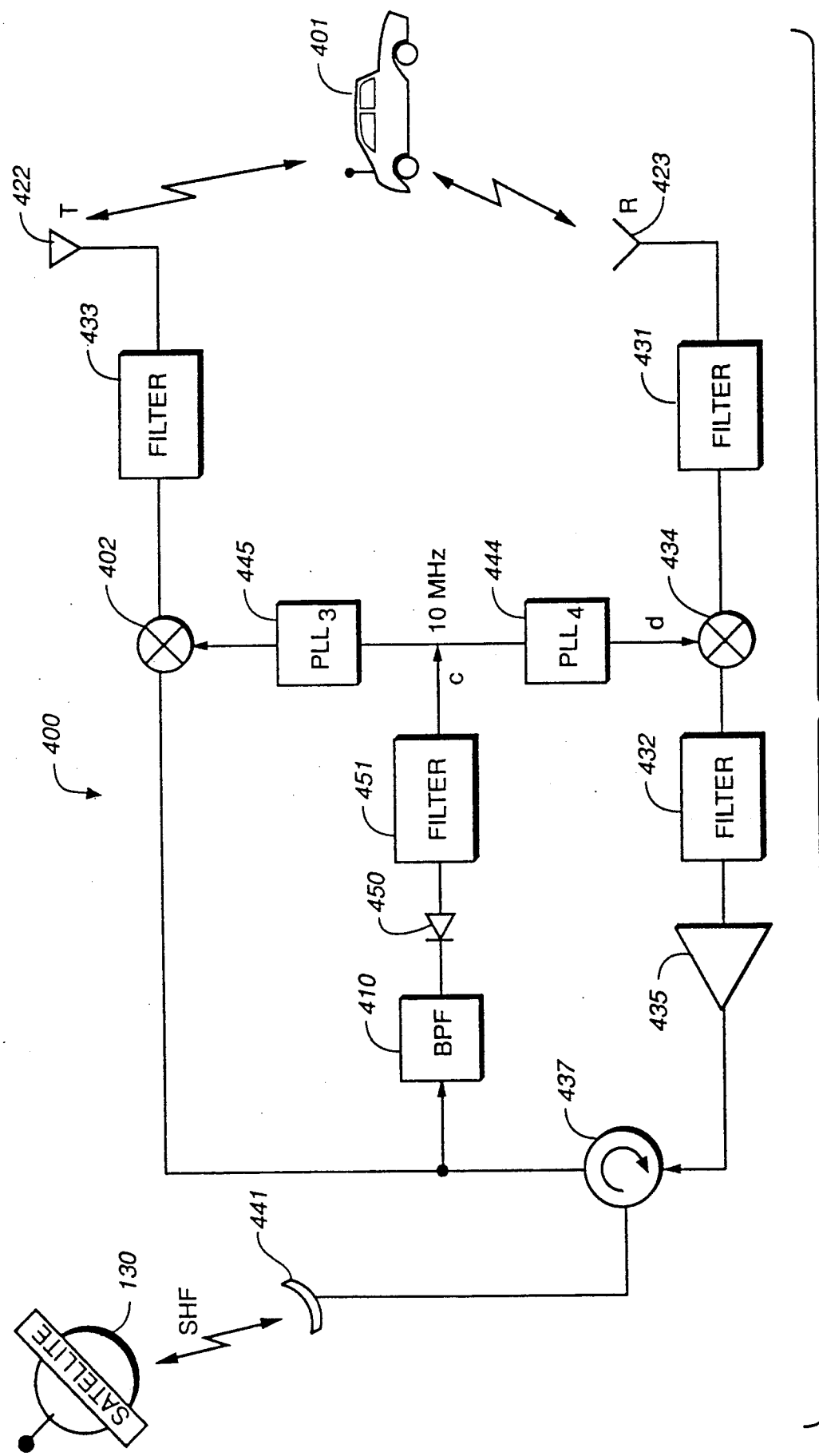
FIG._4

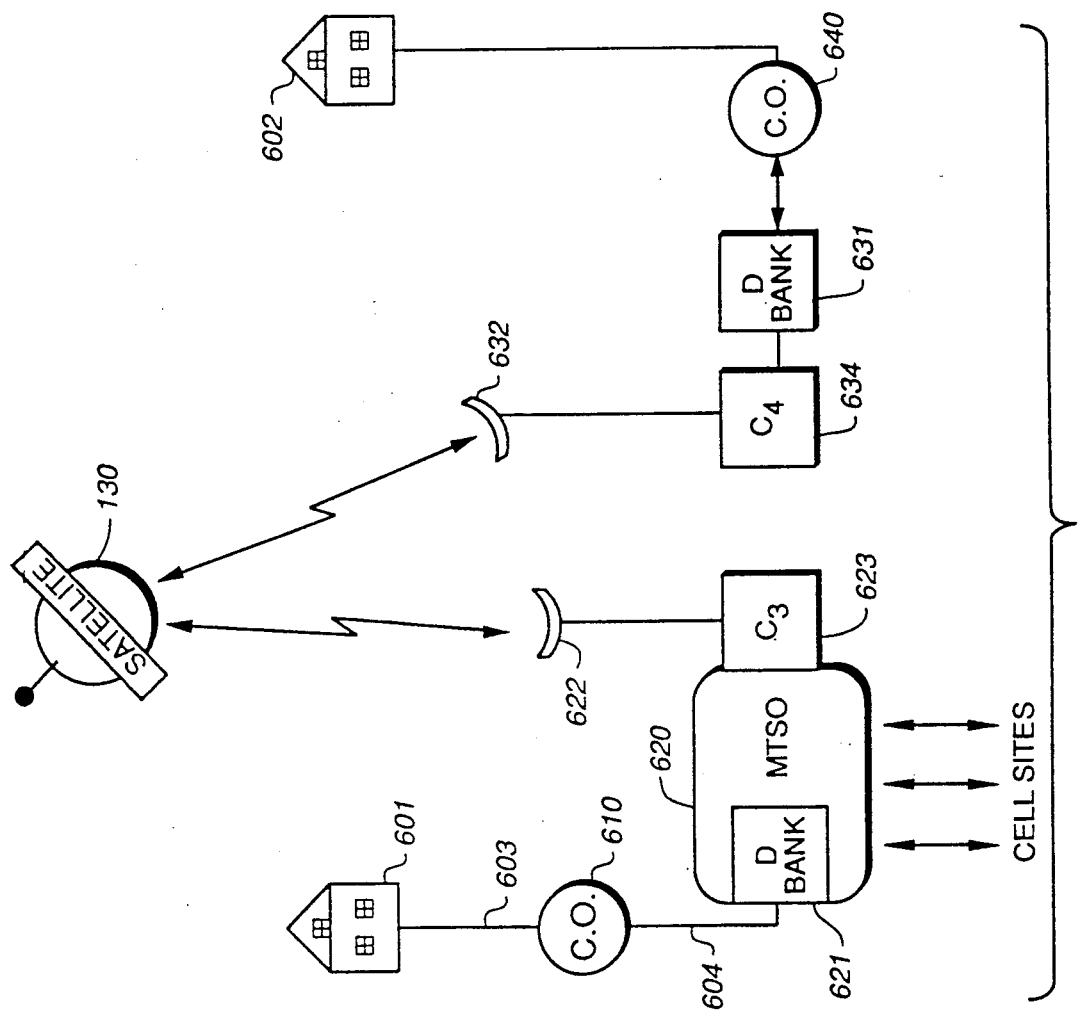
FIG._6
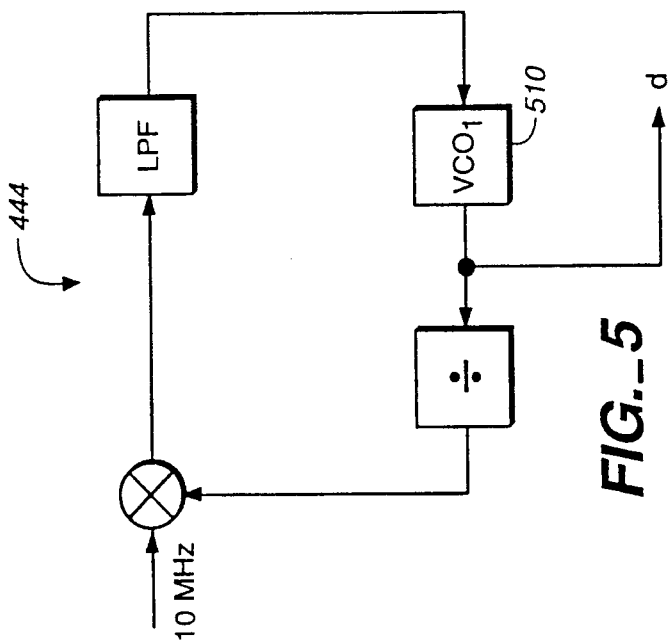
FIG._5

SATELLITE MOBILE COMMUNICATION SYSTEM FOR RURAL SERVICE AREAS

FIELD OF THE INVENTION

The present invention relates generally to satellite mobile communications systems and more particularly to a satellite link for rural service area mobile telephone systems.

BACKGROUND OF THE INVENTION

A good mobile telephone cellular communications system should appear to be just like a regular household or business telephone system from the user's perception.

When a user in a car (the "mobile unit") desires to make a call, the mobile telephone unit scans the set-up channels, selects the strongest and locks on for a certain time. Each cell site is assigned a different set-up channel, so locking on to the strongest usually means selecting the nearest cell site in what is termed a "self-location" scheme. Such a scheme does not require the cell sites to locate the mobile unit, but for calls to mobile units, the paging process is longer because no mobile unit location information is available at the cell sites.

A call request sent from the mobile unit is received by a cell site which typically selects a directive antenna for the communications channel. At the same time, the cell site also sends a request for a voice channel to the Mobile Telephone Switching Office (MTSO) via a high-speed data link. The MTSO selects an appropriate voice channel for the call and the cell site links the channel with the directive antenna to the mobile unit. The MTSO also connects the wire-line party through the telephone company central office.

A call from a land-line party to a mobile unit goes first to the telephone company central office which recognizes that the number is for a mobile unit and forwards the call to the MTSO. The MTSO sends a paging message to certain cell sites based on the mobile unit number and a search algorithm. Each cell site transmits the page on its own set-up channel. The mobile unit recognizes its own identification on a strong set-up channel, locks onto it, and responds to the cell site instruction to tune to an assigned voice channel.

Cellular mobile systems in the United States have been designated as Cellular Geographic Service Areas (CGSA). The largest few hundred cities are called Metropolitan Statistical Areas (MSA) and the rest of the CGSAs are called Rural Service Areas (RSA). RSAs are typically adjacent to MSAs, and can also be scattered as remote geographical spots throughout a country.

For further detail regarding mobile communications systems, see *Mobile Cellular Telecommunications Systems* (McGraw-Hill 1989) by William C.Y. Lee.

An important problem in cellular communications is to provide cost-effective coverage to RSAs that provides adequate service to rural users. Further the RSA system must not interfere with MSA coverage. The cost-effective aspect is crucial in RSAs because of the typically limited number of users.

Accordingly, it is an object of the present invention to provide a new cost-effective mobile communications system.

It is a further object of the present invention to provide a mobile communications system suitable for rural service areas.

It is another object of the present invention to provide a mobile communications system which provides adequate service at minimal complexity, cost, and power.

SUMMARY OF THE INVENTION

The present invention provides a mobile communications system which operates in conjunction with a communications satellite and a Mobile Telephone Switching Office (MTSO). The system communicates with a plurality of mobile units via the satellite. There is at least one cell site with a cell site converter located there. The cell site converter converts signals from the satellite to signals for the MTSO and vice-versa. The cell site converter has an antenna for communicating with the satellite and a MTSO communication means for communicating with the mobile telephone switching office. For communicating with the mobile units, there are remote converter sites for coverage of given geographical areas. Each remote site has a remote converter for converting satellite signals to mobile unit signals and vice-versa. Each of the remote converters includes an antenna for communicating with the satellite, and a transmitter and a receiver for communicating with the mobile units.

Because of the geographically widely-scattered remote converter sites, there may be some frequency and phase differences among signals from the remote sites to the satellite. The present invention therefore synchronizes the signals from the remote sites to the satellite so as to avoid frequency- and phase-drift.

The present invention is ideally suited for rural service area (RSA) mobile communications because (1) it provides a broad geographical coverage which can include isolated spots, (2) it is operable through a single communications satellite link which is generally adequate for RSAs because of a typically lower volume of calls in RSAs, thereby significantly reducing costs, (3) minimal equipment and complexity is required at the remote converter sites, thereby producing even more cost savings and achieving efficiency of operation, and (4) the RSA system shares one MTSO with MSA systems thereby further reducing cost and equipment requirements.

The placement of the cell-site converter at the cell site and the remote converters at the remote sites and the use of the single satellite link allow the realization of the above advantages of the present invention.

A further understanding of the nature and advantages of the present invention may be realized by reference to the Detailed Description of the Invention and the attached drawings.

BRIEF DESCRIPTION OF THE DRAWINGS

FIG. 1 is a schematic diagram of a satellite mobile communications system according to the present invention.

FIG. 2 is a schematic diagram of an exemplary cell site converter located in a RSA cell site according to the present invention.

FIG. 3 is a schematic representation of a phase-lock loop as utilized in a cell site converter according to the present invention.

FIG. 4 is a schematic diagram of a remote converter at a RSA converter site according to the present invention.

FIG. 5 is a schematic representation of a phase-lock loop as utilized in a remote converter at a RSA site according to the present invention.

FIG. 6 schematically shows a satellite link between an MTSO and a Central Office (CO) according to the present invention.

DETAILED DESCRIPTION OF THE INVENTION

Communications satellites, acting as radio-frequency repeaters or transponders, are commonly used to provide links for earth-based communications. The satellites are typically in geostationary orbit and generally capable of line-of-sight microwave links with earth stations. Communications satellites feature wide bandwidths for high channel capacity for voice, data, and image communications thereby providing multiple access so that a large number of users can communicate via the same satellite. Thus, communications satellites may be ideally utilized for mobile telephone communication.

In a typical satellite mobile telephone system, a telephone call enters an earth station where it is combined with other signals which modulate an uplink microwave carrier having a frequency of typically 6 GHz. The satellite receives the signal, amplifies it, and down-converts to the downlink carrier at typically 4 GHz. At the receiving earth station, the signal is amplified by a low-noise receiver, down-converted to an intermediate frequency, typically 800 MHz, and transmitted by terrestrial facilities.

One prior art approach to provide mobile telephone service to Rural Service Areas (RSA) is to utilize satellites to provide communications links between a Mobile Telephone Switching Office (MTSO) and cell sites with a cell site at every RSA site. Such a system has the disadvantage of extremely costly operation. Each cell site requires expensive equipment to service its cell. Further, for the typically large areas in RSAs, the terrestrial microwave network requirements for connecting the MTSO to the cell sites are very costly and the RSA system does not share an MTSO with existing Metropolitan Statistical Area (MSA) systems.

According to the present invention, a cost-effective single satellite link is used to link a plurality of remote converter sites at different remote RSA sites and a "virtual" RSA cell site, which comprises a cell site and a cell-site converter. The remote converter sites receive and transmit UHF signals to the mobile units in the remote RSA sites. The signals are converted to satellite communication frequencies termed Super High Frequency (SHF) for communication over the single satellite link to the satellite. The satellite communicates via SHF by either up-converting from UHF or down-converting to UHF at the RSA cell site which is communicating with the MTSO. In the preferred embodiment, the RSA cell site is co-located with the MTSO. A single satellite link presently can manage approximately 40-50 channels. These channels are shared by multiple RSA converter sites. The use of a single link provides considerable cost savings, and is adequate for the typical volume of RSA calls. The use of limited numbers of RSA cell sites with their requirements also presents considerable cost savings. The converter sites are relatively inexpensive and simple to operate.

The scheme of the present invention is shown in FIG. 1. Exemplary mobile units 101 and 102 communicate via UHF with exemplary converter sites 160, 161, 162, and 163. Each of remote converter sites 160-163 include remote converters 110-113 which each comprise an antenna (exemplified by 121 on converter 111), a transmitter 122, and a receiver 123. Each RSA can be served by one or more remote converters. Remote converters 110-113 communicate via SHF with a communications satellite 130. Satellite 130 communicates via SHF with a virtual RSA cell site 140 which is communicatively coupled to a MTSO 150. Virtual RSA cell site 140 comprises an antenna 141 and a cell site converter 145, which converts SHF signals to UHF signals.

Downlink SHF signals from satellite 130 to remote converters 110-113 and to RSA cell site 140 are combined at satellite 130 in a manner known in the art and re-transmitted to the specific remote converters and RSA cell sites in the predetermined communication channels.

Uplink SHF signals from remote converters 110—113, however, originate from geographically scattered sites and may experience some frequency and phase differences among the different remote sites. Since the UHF signals (typically 800 MHz) are converted to much higher frequency uplink SHF signals (typically 6 GHz), a small frequency and/or phase drift in UHF will cause a large drift when up-converted to SHF and then down-converted to UHF. Therefore, the present invention provides a means and method to synchronize the uplink SHF signals to the satellite.

FIG. 2 is a schematic diagram of an exemplary cell site converter 200 located in a RSA cell site such as 140. A direct heterodyne system is utilized in which the output signal frequency is linearly down- or up-converting the input signal frequency by means of a phase-lock loop 212 fed by a signal generated by a local oscillator 210.

According to one embodiment of the present invention, a pilot signal is also generated to provide a common-source clock reference upon which the uplink SHF signals from converter 200 may be synchronized. This is particularly desired because satellite 130 transmits the signals to widely-scattered RSA remote converter sites 160-163.

First consider a transmission from cell site converter 200 to satellite 130. A UHF signal is received from MTSO 150. Cell site converter 200 may be communicatively coupled to MTSO 150 by any suitable means. For example, cell site converter 200 may be co-located with MTSO 150, connected by a T1 carrier line or microwave coupled. Local oscillator 210 generates a 10 MHz pilot signal which is phase-locked by phase-lock loop 212. Mixer 201 up-mixes the UHF signal to SHF and filter 220 passes either the high or low band by predetermined choice. A SHF amplifier 222 amplifies the signal for transmission through circulator 224 to satellite 130 via SHF antenna 141. The 10 MHz signal from local oscillator 210 is also sent to PIN modulator 230 for amplitude modulation of the signal at SHF frequency under the control of phase-lock loop 212. Thus phase-lock loop 212 provides a SHF carrier signal with a common phase provided by the 10 MHz pilot signal generated by local oscillator 210. The output of PIN modulator 230 is coupled to the output of SHF amplifier 222 so that a SHF pilot signal is transmitted with the SHF signal to satellite 130.

Phase-lock loop 212 is shown schematically in FIG. 3. A phase-lock loop is a circuit for synchronizing a variable oscillator with the phase of transmitted signal. The 10 MHz pilot signal from local oscillator 210 is fed into a mixer 301 which is coupled with a local replica signal derived from a dividing circuit 305, which in turn is coupled to a voltage-controlled oscillator (VCO) 310. The output of mixer 301 is the error signal passing through a low-pass filter 320 which in turn is controlling VCO 310. The output of VCO 310, before division by dividing circuit 305, is just the SHF carrier signal. The SHF carrier is coupled to PIN modulator 230 which modulates the 10 MHz pilot signal onto the SHF carrier. Thus, for the uplink to satellite 130, VCO 310 provides the SHF (typically 6 GHz) carrier frequency for up-converting UHF signals at a mixer 201 (node a) and also for up-converting the 10 MHz pilot signal from local oscillator 210 at PIN modulator 230 (node c). The modulated pilot signal at SHF frequencies is provided at node b. Thus, the up-converted UHF signal and the 10 MHz pilot signal on a SHF carrier are combined at node b for transmission by SHF antenna 141 to satellite 130.

Returning to FIG. 2, considering reception and conversion of SHF satellite signals, a SHF signal is received at SHF antenna 141. Circulator 224 directs the signal to filter 240 which passes the high or low band (whichever is opposite to that passed by filter 220 in the transmission process to satellite 130). The signal is down-mixed at mixer 202 which is also coupled to phase-lock loop 214, which locks on the 10 MHz pilot signal from local oscillator 210 and down-mixes the downlink SHF signal. Phase-lock loop 214 operates just as phase-lock loop 212 except for a VCO (not shown) for generating downlink mixing frequencies. The SHF signal has now been converted to UHF with the pilot signal providing the synchronization. The UHF signal is then amplified by amplifier 242 for transmission to RSA cell site 140 (of FIG. 1).

FIG. 4 is a schematic diagram of a remote converter 400 at a RSA remote converter site such as 160-163 (of FIG. 1). Remote converter 400 utilizes direct heterodyne circuitry and the same SHF satellite frequencies as converter 200 (of FIG. 2).

An exemplary mobile unit 401 transmits UHF signals to receiving antenna 423. The signal is filtered by filter 431 and up-mixed to uplink SHF at mixer 434 using a common phase provided by a 10 MHz pilot signal by means of a phase-lock loop 444. Thereafter, the SHF signal is filtered by filter 432 to confine the signal to its predetermined frequency range, and amplified by amplifier 435. The common phase provided by the 10 MHz pilot signal is carried by the amplified uplink SHF signal and is directed to antenna 441 by circulator 437.

For UHF paging and transmitting information, modulated satellite SHF downlink signals are received at antenna 441, circulated to the parallel configuration of band pass filter (BPF) 410 and mixer 402. The downlink signal from satellite 130 can be meant for a remote converter site or a RSA cell site (as shown in FIG. 1). Which type of site is determined by the predetermined choice of the UHF upper or lower side band. That is, if the upper side band is chosen for the transmission at the RSA cell site, then the lower side band is used for the transmission at the remote converter sites.

The SHF signal from band-pass filter 410 is selected by detector 450 which is an envelope detector. The 10 MHz pilot signal is recovered at node c and its upperband noise is reduced by a low-pass filter 451. Phase-lock loop 445 provides the satellite downlink carrier, which frequency is determined by the particular satellite. Phase-lock loop 444 provides the satellite uplink carrier. By recovering the 10 MHz signal, there is no requirement of a local oscillator (such as 21 of FIG. 2), the signals being synchronized by the recovered common 10 MHz pilot signal to a common phase at SHF for all RSA remote converter sites.

The SHF signal is down-converted at mixer 402 via phase-lock loop 445, filtered by filter 433 and transmitted by transmitting antenna 422 to mobile unit 401.

FIG. 5 schematically shows phase-lock loop 444 which operates in the same fashion as phase-lock loop 212 of FIG. 3 with VCO 510 operating at uplink SHF frequencies.

An alternative embodiment of the present invention is to utilize a precision clock at the cell site to provide uplink synchronization of the signals from the remote converter sites. This can be achieved by having a clock providing clock errors of substantially $10^{-10}$ or less. The clock requires an initial line-up set-up and a periodic alignment check to insure proper signal synchronization.

A telephone system typically has a Central Office (CO) which provides the wirelines for the telephones in the area. A RSA would have such a CO within its area. If there is a CO in the RSA, then calls from mobile units and local landlines would be local calls. If the MTSO is located in a Metropolitan Statistical Area (MSA) far from the CO within the RSA, then the calls from mobile units to local landlines may become long-distance calls. To avoid the mobile calls from becoming long-distance calls, the communication between the MTSO and the CO can be made via the satellite link.

FIG. 6 schematically shows an arrangement according to the present invention whereby a satellite link between MTSO and CO is made. An exemplary home 601 is connected by wireline 603 to CO 610 which in turn is connected by wireline 604 to a data bank 621 which is located at MTSO 620. Data bank 621 performs the analog to digital and bit rate conversions required by MTSO 620, as are known in the communications art. MTSO 620 is communicatively coupled to RSA cell sites as shown in FIG. 1. A MTSO converter 623 communicates with satellite 130 via antenna 622. MTSO converter 623 is a simple baseband up/down SHF converter which allows communications with satellite 130 for the purposes of linking MTSO 620 with CO 640. CO 640 communicates with satellite 130 via antenna 632 which is connected to a CO converter 634 which in turn is connected by a data bank 631.

The present invention has the further advantage that for paging of the mobile units, only a single hop from the cell site up to the satellite then down to the mobile units is required. That is, utilizing a satellite allows a downlink page to all converter sites simultaneously. In land-based cellular systems, multiple hops using microwave backbone systems from cell site to cell site are typically required.

While the above description provides a full and complete description of the preferred embodiments of the present invention, various modifications, alternate constructions and equivalents may be employed. For example, the present invention is not limited to so-called rural service areas, but can advantageously provide adequate service to any situation where there are fewer mobile users, as in a less developed country. Therefore, the above description and illustrations should not be construed as limiting the scope of the invention which is defined by the following claims.

I claim:

1. A mobile communications system, utilizing at least one communications satellite and at least one mobile telephone switching office (MTSO), for communicating with a plurality of mobile units via said satellite, the system comprising:
   at least one cell site having a cell site converter thereat for converting signals from said satellite to signals too said MTSO and vice-versa, said cell site converter having an antenna for communicating with said satellite and a MTSO communication means for communicating with said mobile telephone switching office; and
   at least one remote converter site each having at least one remote converter thereat for converting signals from said satellite to signals for said mobile units and vice-versa, each of said remote converters including an antenna for communicating with said satellite, a transmitter and a receiver for communicating with said mobile units, and means for synchronizing the frequency and phase of the signals from said remote converter to said satellite.

2. The mobile communications system of claim 1 wherein said cell site converter and said remote converters communicate with said satellite over a single satellite communications link.

3. The mobile communications system of claim 1 wherein said cell site is co-located with said mobile telephone switching office.

4. The mobile communications system of claim 1 wherein said cell site converter further comprises pilot signal generating means for generating a pilot signal, and said plurality of remote converters each further comprise pilot signal recovery mans for recovering said pilot signal for frequency- and phase-synchronizing the communications from said remote converters to said satellite.

5. A mobile communications system, utilizing at least one communication satellite and at least one mobile telephone switching office (MTSO), for communicating with a plurality of mobile units in at least one rural service area via said satellite, said mobile communications system further utilizing at least one first wireline central office connecting landline telephones to said MTSO, and at least one second wireline central office connecting landline telephones to a remote site in one of said rural service area, the mobile communications system comprising:
   a MTSO converter disposed at said MTSO for converting signals from said satellite to signals for said MTSO and vice-versa via a MTSO converter antenna:
   a first data bank means disposed at said MTSO and coupled between said first central office and said MTSO for converting communications from said first wireline central office for use inn said MTSO and vice-versa;
   a remote CO converter disposed at said remote site for converting signals from said satellite to signals for said second wireline central office and vice-versa via a remote CO converter antenna, said remote CO converter further includes means for synchronizing the frequency and phase of said signals from said remote CO converter to said satellite; and
   a second data bank disposed at said remote site and coupled between said remote CO converter and said second wireline central office for converting communications from said remote CO converter to said second wireline office and vice-versa.

6. A mobile communications system, utilizing at least one communications satellite and at least one mobile telephone switching office, for communicating with a plurality of mobile units via said satellite, the system comprising:
   at least one cell site having a cell site converter thereat for converting signals from said satellite to signals for said MTSO and vice-versa, said cell site converter having an antenna for communicating with said satellite and a MTSO communication means for communicating with said mobile telephone switching office;
   at least one remote converter site each having at least one remote converter thereat for converting signals from said satellite to signals for said mobile units, each of said remote converters including an antenna for communicating with said satellite, and a transmitter and a receiver for communicating with said mobile units;
   said cell site converter and said remote converters further communicating with said satellite over a single satellite communications link;
   said cell site further being co-located with said mobile telephone switching office; and
   said cell site converter further comprising pilot signal generating means for generating a pilot signal, and said plurality of remote converters each further comprising pilot signal recovery means for recovering said pilot signal for frequency- and phase-synchronizing the communications from said remote converters to said satellite.

* * * * *

UNITED STATES PATENT AND TRADEMARK OFFICE
CERTIFICATE OF CORRECTION

PATENT NO. : 5,081,703

DATED : January 14, 1992

INVENTOR(S) : Lee

It is certified that error appears in the above-identified patent and that said Letters Patent is hereby corrected as shown below:

Column 5, line 22, delete "14" and insert therefor --141--.

Column 6, line 2, delete "21" and insert therefor --210--.
Column 6, line 37, delete "62i" and insert therefor --621--.
Column 7, line 8, delete "too" and insert therefor --for--.
Column 8, line 6, delete "inn" and insert therefor --in--.

Signed and Sealed this

Third Day of August, 1993

*Attest:*

MICHAEL K. KIRK

*Attesting Officer*  Acting Commissioner of Patents and Trademarks